(12) United States Patent
Ali et al.

(10) Patent No.: US 9,609,630 B2
(45) Date of Patent: Mar. 28, 2017

(54) UPLINK ANTENNA SELECTION DEVICE AND METHOD

(71) Applicant: BlackBerry Limited, Waterloo (CA)

(72) Inventors: Shirook M. Ali, Waterloo (CA); Faruk Erkmen, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 154 days.

(21) Appl. No.: 14/186,505

(22) Filed: Feb. 21, 2014

(65) Prior Publication Data

US 2015/0245316 A1    Aug. 27, 2015

(51) Int. Cl.
*H04W 72/02* (2009.01)
*H04W 72/04* (2009.01)
(Continued)

(52) U.S. Cl.
CPC ............ *H04W 72/02* (2013.01); *H01Q 1/243* (2013.01); *H01Q 5/00* (2013.01); *H01Q 21/28* (2013.01);
(Continued)

(58) Field of Classification Search
CPC ........ H04B 1/50; H04B 7/024; H04B 7/0421; H04B 7/061; H04B 7/0619; H04B 7/066; H04B 7/0632; H04B 7/0689; H04B 7/082; H04B 7/0868; H04B 7/0608; H04B 7/0602; H04B 7/0802; H04B 7/0814; H04B 7/0404; H04B 7/0822; H04B 7/0604; H04B 7/0817; H04W 24/02; H04W 36/30; H04W 88/06;
(Continued)

(56) References Cited

U.S. PATENT DOCUMENTS

| 7,983,222 B2 | 7/2011 | Giaimo et al. |
| 2006/0217128 A1 | 9/2006 | Chen et al. |

(Continued)

FOREIGN PATENT DOCUMENTS

EP    2650966 A2    10/2013

OTHER PUBLICATIONS

European Patent Application No. EP 15 15 5840.0 dated Jul. 6, 2015.

*Primary Examiner* — Anthony Addy
*Assistant Examiner* — Martin Chang
(74) *Attorney, Agent, or Firm* — Perry + Currier, Inc.

(57) ABSTRACT

An uplink antenna selection device and method are provided. The device comprises: at least two antennas; at least one antenna feed connected to each antenna, each antenna configured to transmit data on a respective given transmission band paired with a respective associated receive band; and, a processor, in communication with the at least one antenna feed. The processor is configured to: for each of the antennas, determine a respective quality-of-signal (QOS) parameter of at least one respective receive band adjacent to the respective given transmission band, the at least one respective receive band different from the respective associated receive band paired with the respective given transmission band; and control the at least one antenna feed to select one of the antennas for transmitting data on the respective given transmission band based on the respective QOS parameter of the at least one respective receive band for each of the antennas.

15 Claims, 8 Drawing Sheets

(51) Int. Cl.
    *H04W 72/08*    (2009.01)
    *H04W 88/06*    (2009.01)
    *H01Q 1/24*     (2006.01)
    *H01Q 21/28*    (2006.01)
    *H01Q 5/00*     (2015.01)
    *H04B 7/06*     (2006.01)

(52) U.S. Cl.
    CPC ........ *H04B 7/0608* (2013.01); *H04W 72/046* (2013.01); *H04W 72/0453* (2013.01); *H04W 72/085* (2013.01); *H04W 88/06* (2013.01)

(58) Field of Classification Search
    CPC ............ H04W 72/046; H04W 72/082; H04W 72/0413; H04W 72/08; H04W 72/085
    USPC .......................................... 455/78, 101, 140
    See application file for complete search history.

(56) References Cited

U.S. PATENT DOCUMENTS

| 2008/0240280 | A1  |         | 10/2008 | Li      |          |
|--------------|-----|---------|---------|---------|----------|
| 2012/0302183 | A1* | 11/2012 | Pescod et al. | .................. | 455/78 |
| 2013/0308477 | A1* | 11/2013 | He et al. | ....................... | 370/252 |
| 2014/0140224 | A1* | 5/2014  | Hakansson | .......... | H04B 7/0608 |
|              |     |         |         |         | 370/252 |

\* cited by examiner

| | 1 | 2 | | 3 | |
|---|---|---|---|---|---|
| Rx | Notes | Adjacent | Notes | Average | Notes |
| B17 | -0.22 | | | | |
| B13 | -1.06 | 0.29 | B20 RX lc (791) | 0.04 | avg of B20 RX mc (806) and B13 RX hc (756) = -6.12dB (781 MHz) |
| B20 | -1.13 | | | | |
| B5 | -0.27 | -0.24 | B20 RX hc (821) | -0.21 | avg of B5 RX lc (874) and B20 RX hc (821) = -8.02dB (847 MHz) |
| B8 | 0.49 | -0.23 | B5 RX mc (882) | -0.84 | avg of B5 RX lc (874) and B20 RX mc (806) = -8.02dB (840 MHz) |
| B4 | -2.64 | -0.40 | B3 RX lc (1805) | | |
| B3 | -0.50 | -0.29 | B3 RX lc (1805) | | |
| B2 | -0.66 | 0.00 | B3 RX hc (1880) | 0.15 | avg of B3 RX mc (1843) and B2 RX lc (1935) = -7.05dB (1889) |
| B1 | -1.12 | -0.04 | B2 RX channels corresponding to B1 TX channels | | |
| B7 | -0.46 | -0.47 | B7 RX lc (2620) | | |

Fig. 8

UPLINK ANTENNA SELECTION DEVICE AND METHOD

FIELD

The specification relates generally to antennas, and specifically to an uplink antenna selection device and method.

BACKGROUND

Current mobile electronic devices, such as smartphones, tablets and the like, generally have more than one antenna at different locations in the device. One antenna can be selected over another antenna, in an antenna selection (AS) process which is an antenna diversity technique generally used to improve the quality and the reliability of a wireless link. The diversity comes from having the choice to transmit on antennas that experience different near-field environments due, for example, to the presence of the operating user and the close surroundings that each of the antennas sees. The propagation channel characteristics that each antenna interacts with would most likely be different from one antenna to another, adding another factor to diversity as each of the antennas can experience different fading levels for the same usage scenario. In uplink (UL) antenna selection, an uplink signal is fed into one of several available antennas for UL transmission where the antenna selected is based on an optimization criterion.

Even if both antennas are identically designed and offer identical free space (FS) characteristics, both for reception (downlink or DL) and transmission (UL), it is probable that one of the antennas would offer a better long term link performance in practical usage cases due to real-world effects such as hand(s) and/or head placement on the device.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 8 depicts measurements of a prototype of the device of FIG. 1, according to non-limiting implementations.

DETAILED DESCRIPTION

Figure 1:
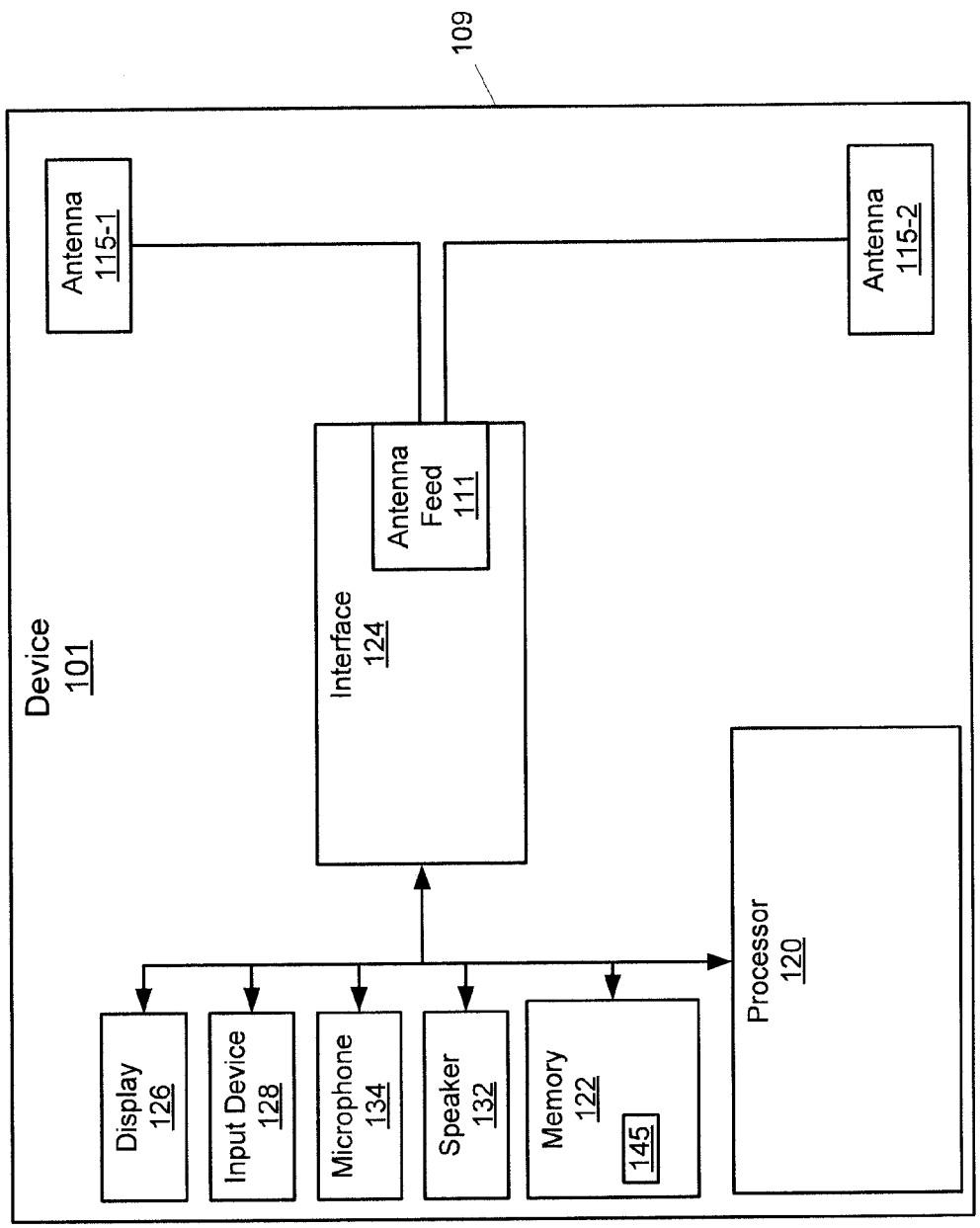
FIG. 1 depicts a schematic diagram of an up-link antenna selection device, according to non-limiting implementations.

The present disclosure describes examples of an uplink antenna selection device and method where the device selects between two or more antennas for an uplink (e.g. for a data transmission) on a given transmission band by examining quality-of-signal parameters on at least one adjacent receive band for each antenna, the adjacent receive bands being different from an associated receive band paired with the given transmission band. The antenna having the best quality-of-signal parameter on the least one adjacent receive band is used for the uplink. The nearest receive band can be used to make the selection and/or an average of the two nearest receive bands can be used.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

Furthermore, as will become apparent in this specification, certain antenna components may be described as being configured for generating a resonance at a given frequency and/or resonating at a given frequency and/or having a resonance at a given frequency. In general, an antenna component that is configured to resonate at a given frequency, and the like, can also be described as having a resonant length, a radiation length, a radiating length, an electrical length, and the like, corresponding to the given frequency. The electrical length can be similar to, or different from, a physical length of the antenna component. The electrical length of the antenna component can be different from the physical length, for example by using electronic components to effectively lengthen the electrical length as compared to the physical length. The term electrical length is most often used with respect to simple monopole and/or dipole antennas. The resonant length can be similar to, or different from, the electrical length and the physical length of the antenna component. In general, the resonant length corresponds to an effective length of an antenna component used to generate a resonance at the given frequency; for example, for irregularly shaped and/or complex antenna components that resonate at a given frequency, the resonant length can be described as a length of a simple antenna component, including but not limited to a monopole antenna and a dipole antenna, that resonates at the same given frequency.

A first aspect of the specification provides a device comprising: a first antenna; a second antenna; at least one antenna feed connected to the first antenna and the second antenna, each of the first antenna and the second antenna configured to transmit data on a respective given transmission band, each paired with a respective associated receive band; and, a processor, in communication with the at least one antenna feed, the processor configured to: for each of the first antenna and the second antenna, determine a respective quality-of-signal (QOS) parameter of at least one respective receive band adjacent to the respective given transmission band, the at least one respective receive band different from the respective associated receive band paired with the respective given transmission band; and control the at least one antenna feed to select one of the first antenna and the second antenna for transmitting data on the respective given transmission band based on the respective QOS parameter of the at least one respective receive band for each of the first antenna and the second antenna.

The respective given transmission band can be selected based on one of: a same receive band for each of the first antenna and the second antenna; and, a different receive band for each of the first antenna and the second antenna, each of the same receive band and the different receive band different in frequency from the respective given transmission band.

The processor can be further configured to control the at least one antenna feed to select one of the first antenna and the second antenna for transmitting the data on the respective given transmission band by comparing the respective QOS parameter of the at least one respective receive band for each of the first antenna and the second antenna.

The processor can be further configured to control the at least one antenna feed to select one of the first antenna and the second antenna for transmitting the data on the respective given transmission band by comparing an average of respective QOS parameters of at least two respective receive bands for each of the first antenna and the second antenna, the at least two respective receive bands including the at least one respective receive band and another respective receive band adjacent to the respective given transmission band. The another respective receive band adjacent to the respective given transmission band can be different from the respective associated receive band paired with the respective given transmission band. The another receive band adjacent to the respective given transmission band, can comprise the respective associated receive band paired with the respective given transmission band.

The at least one receive band different from the respective associated receive band paired with the respective given transmission band can be associated with one or more of a different radio standard, a different mobile phone standard, and a different generation standard than the respective associated receive band and the respective given transmission band.

The processor can be further configured to select the respective given transmission band from a plurality of transmission bands, based on QOS parameters of respective receive bands adjacent to each of the plurality of transmission bands.

A first transmission frequency of a first given transmission band of the first antenna, a first receive frequency of a first receive band of the first antenna used to evaluate the first given transmission band, a second transmission frequency of a second given transmission band of the second antenna, and a second receive frequency of a second receive band of the second antenna used to evaluate the second given transmission band can all be different.

A first transmission frequency of a first given transmission band of the first antenna, and a second transmission frequency of a second given transmission band of the second antenna can each be one or more of fixed and predetermined.

Another aspect of the specification provides a method comprising: at a device comprising: a first antenna; a second antenna; at least one antenna feed connected to the first antenna and the second antenna, each of the first antenna and the second antenna configured to transmit data on a respective given transmission band, each paired with a respective associated receive band; and, a processor, in communication with the at least one antenna feed: for each of the first antenna and the second antenna, determining, at the processor, a respective quality-of-signal (QOS) parameter of at least one respective receive band adjacent to the respective given transmission band, the at least one respective receive band different from the respective associated receive band paired with the respective given transmission band; and controlling the at least one antenna feed to select one of the first antenna and the second antenna for transmitting data on the respective given transmission band based on the respective QOS parameter of the at least one respective receive band for each of the first antenna and the second antenna.

The respective given transmission band can be selected based on one of: a same receive band for each of the first antenna and the second antenna; and, a different receive band for each of the first antenna and the second antenna, each of the same receive band and the different receive band different in frequency from the respective given transmission band.

Controlling the at least one antenna feed to select one of the first antenna and the second antenna for transmitting the data on the respective given transmission band can comprise comparing the respective QOS parameter of the at least one respective receive band for each of the first antenna and the second antenna.

Controlling the at least one antenna feed to select one of the first antenna and the second antenna for transmitting the data on the respective given transmission band can comprise comparing an average of respective QOS parameters of at least two respective receive bands for each of the first antenna and the second antenna, the at least two respective receive bands including the at least one respective receive band and another respective receive band adjacent to the respective given transmission band. The another respective receive band adjacent to the respective given transmission band can be different from the respective associated receive band paired with the respective given transmission band. The another receive band adjacent to the respective given transmission band, can comprise the respective associated receive band paired with the respective given transmission band.

The at least one receive band different from the respective associated receive band paired with the respective given transmission band can be associated with one or more of a different radio standard, a different mobile phone standard, and a different generation standard than the respective associated receive band and the respective given transmission band.

The method can further comprise selecting the respective given transmission band from a plurality of transmission bands, based on QOS parameters of respective receive bands adjacent to each of the plurality of transmission bands.

A first transmission frequency of a first given transmission band of the first antenna, a first receive frequency of a first receive band of the first antenna used to evaluate the first given transmission band, a second transmission frequency of a second given transmission band of the second antenna, and a second receive frequency of a second receive band of the second antenna used to evaluate the second given transmission band can all be different.

Yet a further aspect of the specification provides a computer program product, comprising a computer usable medium having a computer readable program code adapted to be executed to implement a method comprising: at a device comprising: a first antenna; a second antenna; at least one antenna feed connected to the first antenna and the second antenna, each of the first antenna and the second antenna configured to transmit data on a respective given transmission band, each paired with a respective associated receive band; and, a processor, in communication with the at least one antenna feed: for each of the first antenna and the second antenna, determining, at the processor, a respective quality-of-signal (QOS) parameter of at least one respective receive band adjacent to the respective given transmission band, the at least one respective receive band different from the respective associated receive band paired with the respective given transmission band; and controlling the at least one antenna feed to select one of the first antenna and the second antenna for transmitting data on the respective given transmission band based on the respective QOS parameter of the at least one respective receive band for each of the first antenna and the second antenna. The computer usable medium can comprise a non-transitory computer usable medium.

FIG. 1 depicts a schematic diagram of a mobile electronic device 101, referred to interchangeably hereafter as device 101. Device 101 comprises: a chassis 109; an antenna feed 111, a first antenna 115-1, and a second antenna 115-2, described in further detail below. Antenna 115-1, 115-2 will be interchangeably referred to hereafter, collectively, as antennas 115 and generically as an antenna 115. Device 101 can be any type of electronic device that can be used in a self-contained manner to communicate with one or more communication networks using antenna 115. Device 101 can include, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Device 101, hence further comprise a processor 120, a memory 122, a display 126, a communication interface 124 that can optionally comprise antenna feed 111, at least one input device 128, a speaker 132 and a microphone 134.

As will be presently explained, device 101 generally comprises first antenna 115-1; second antenna 115-2; at least one antenna feed 111 connected to first antenna 115-1 and second antenna 115-2, each of first antenna 115-1 and second antenna 115-2 configured to transmit data on a respective given transmission band, the respective given transmission band paired with a respective associated receive band; and processor 120, in communication with at least one antenna feed 111, processor 120 configured to: for each of first antenna 115-1 and second antenna 115-2, determine a respective quality-of-signal (QOS) parameter of at least one respective receive band adjacent to the respective given transmission band, the at least one respective receive band different from the respective associated receive band paired with the respective given transmission band; and control at least one antenna feed 111 to select one of first antenna 115-1 and second antenna 115-2 for transmitting data on respective given transmission band based on the respective QOS parameter of the at least one respective receive band for each of first antenna 115-1 and second antenna 115-2. In general, a frequency of a respective given transmission bands for a given antenna 115-1, 115-2 is different from a frequency of the respective associated receive band paired therewith. The respective given transmission band for each of antennas 115-1, 115-2 can be selected based on a QOS parameter for one of: a same receive band for each of first antenna 115-1 and second antenna 115-2; and, a different receive band for each of first antenna 115-1 and the second antenna 115-2. QOS parameters can include, but are not limited to, a signal strength (e.g. in decibels), RSSI (received signal strength indication), signal power, desired signal strength, desired signal power, a channel state, error rate, bandwidth, throughput, transmission delay, availability, jitter, and the like.

It should be emphasized that the structure of device 101 in FIG. 1 is purely an example, and contemplates a device that can be used for both wireless voice (e.g. telephony) and wireless data communications (e.g. email, web browsing, text, and the like). However, FIG. 1 contemplates a device that can be used for any suitable specialized functions, including, but not limited, to one or more of, telephony, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

Memory 122 further stores an application 145 that, when processed by processor 120, enables processor 120 to: for each of first antenna 115-1 and second antenna 115-2, determine a respective quality-of-signal (QOS) parameter of at least one respective receive band adjacent to the respective given transmission band, the at least one respective receive band different from the respective associated receive band paired with the respective given transmission band; and control at least one antenna feed 111 to select one of first antenna 115-1 and second antenna 115-2 for transmitting data on respective given transmission band based on the respective QOS parameter of the at least one respective receive band for each of first antenna 115-1 and second antenna 115-2.

Furthermore, memory 122 storing application 145 is an example of a computer program product, comprising a non-transitory computer usable medium having a computer readable program code adapted to be executed to implement a method, for example a method stored in application 145.

Processor 120 can be further configured to communicate with display 126, and microphone 134 and speaker 132. Display 126 comprises any suitable one of, or combination of, flat panel displays (e.g. LCD (liquid crystal display), plasma displays, OLED (organic light emitting diode) displays, capacitive or resistive touchscreens, CRTs (cathode ray tubes) and the like. Microphone 134 comprises any suitable microphone for receiving sound and converting to audio data. Speaker 132 comprises any suitable speaker for converting audio data to sound to provide one or more of audible alerts, audible communications from remote communication devices, and the like. In some implementations, input device 128 and display 126 are external to device 101, with processor 120 in communication with each of input device 128 and display 126 via a suitable connection and/or link.

Processor 120 also connects to communication interface 124 (interchangeably referred to as interface 124), which can be implemented as one or more radios and/or connectors and/or network adaptors and/or transceivers, configured to wirelessly communicate with one or more communication networks (not depicted) via antennas 115. It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and transmitting signals using antennas 115. It is further appreciated that, as depicted, interface 124 comprises at least one antenna feed 111, which alternatively can be separate from interface 124.

At least one antenna feed 111 generally comprises components which feed radio waves, to antennas 115 in an uplink and/or receives incoming radio waves from antennas 115 in a downlink, and converts them to electric signals. At least one antenna feed 111 can comprise a respective antenna feed for each antenna 115 and/or one antenna feed (as depicted) interacting with both antennas 115. While not depicted, device 101 can comprise a physical and/or logical switch, and the like, for switching between antennas 115; in some implementations, at least one antenna feed 111 and/or interface and/or processor 120 can comprise such a switch.

Each antenna 115 can comprise one or more antennas and/or radiating arms for transmitting (uplink) and receiving (downlink) radio waves on different bands, as described below with respect to FIGS. 2 to 4. Such bands generally correspond to bands used by interface 124 to communicate on the various communication links and communication networks, as described above. Further, each antenna 115 can be: a same type or different types, a same geometry or different geometries, operate at the same frequencies or operate at different frequencies.

While not depicted, device 101 further comprises a power source, not depicted, for example a battery or the like. In some implementations the power source can comprise a connection to a mains power supply and a power adaptor (e.g. an AC-to-DC (alternating current to direct current) adaptor, and the like).

Chassis 109 can comprise an outer housing which houses components of device 101. Chassis 109 can include an internal frame configured to provide structural integrity to device 101. Chassis 109 can be further configured to support components of device 101 attached thereto, for example, display 126.

In any event, it should be understood that a wide variety of configurations for device 101 are contemplated.

Figure 2:
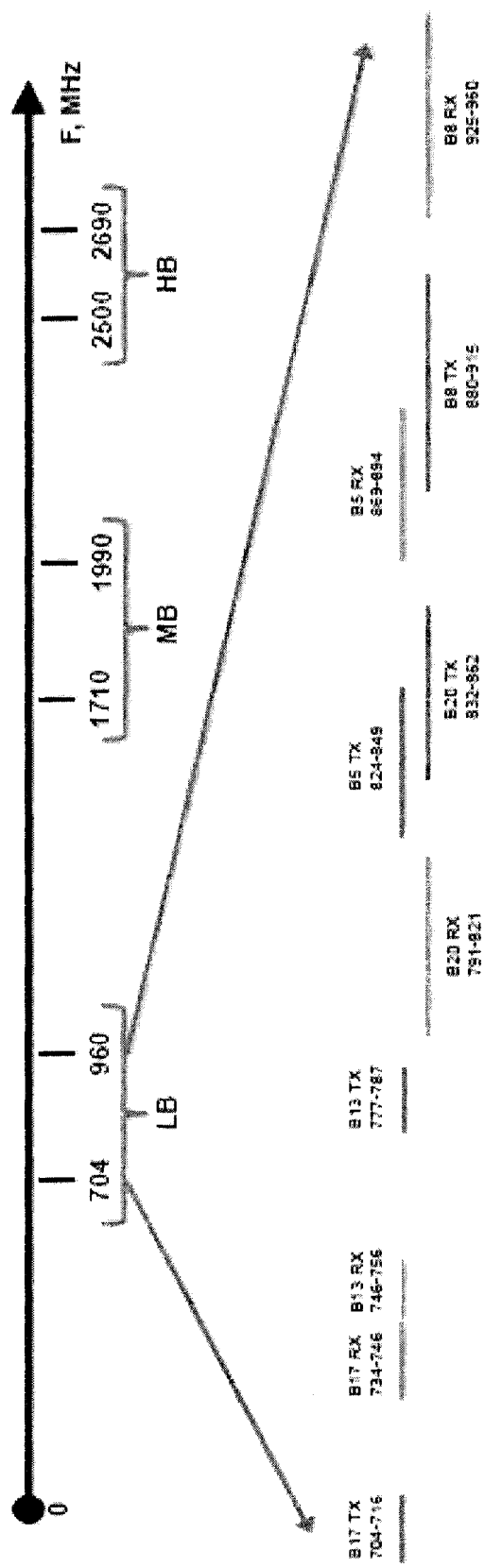
FIG. 2 depicts details of LTE (Long Term Evolution) frequencies in a low band, according to non-limiting implementations.
Figure 3:
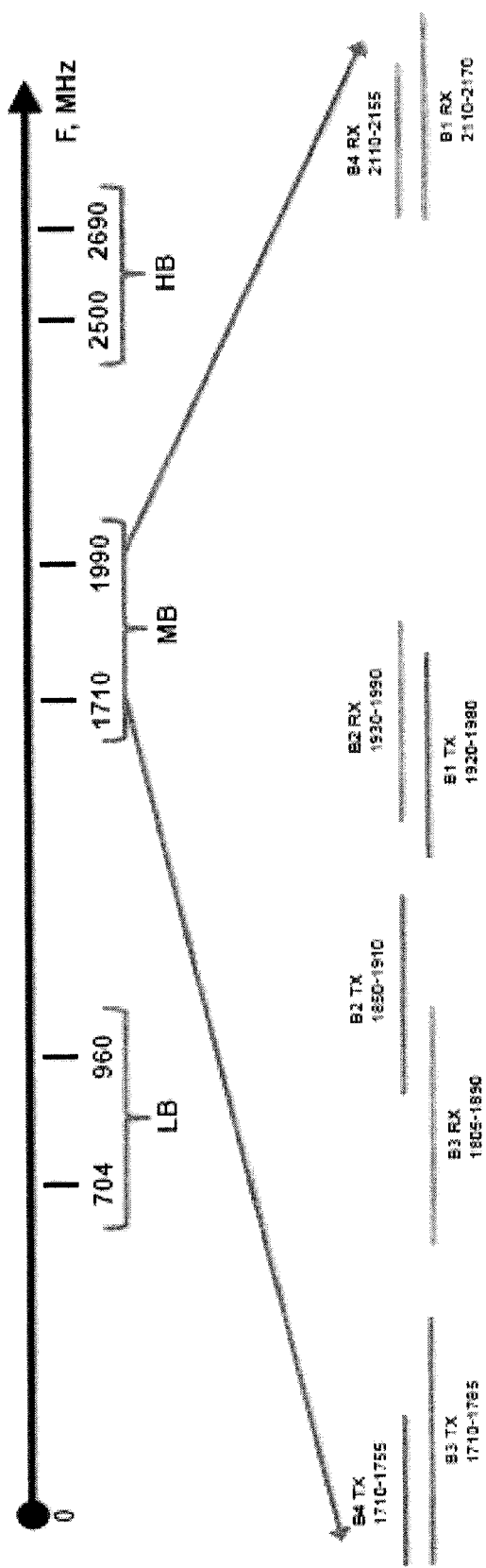
FIG. 3 depicts details of LTE frequencies in a medium band, according to non-limiting implementations.
Figure 4:
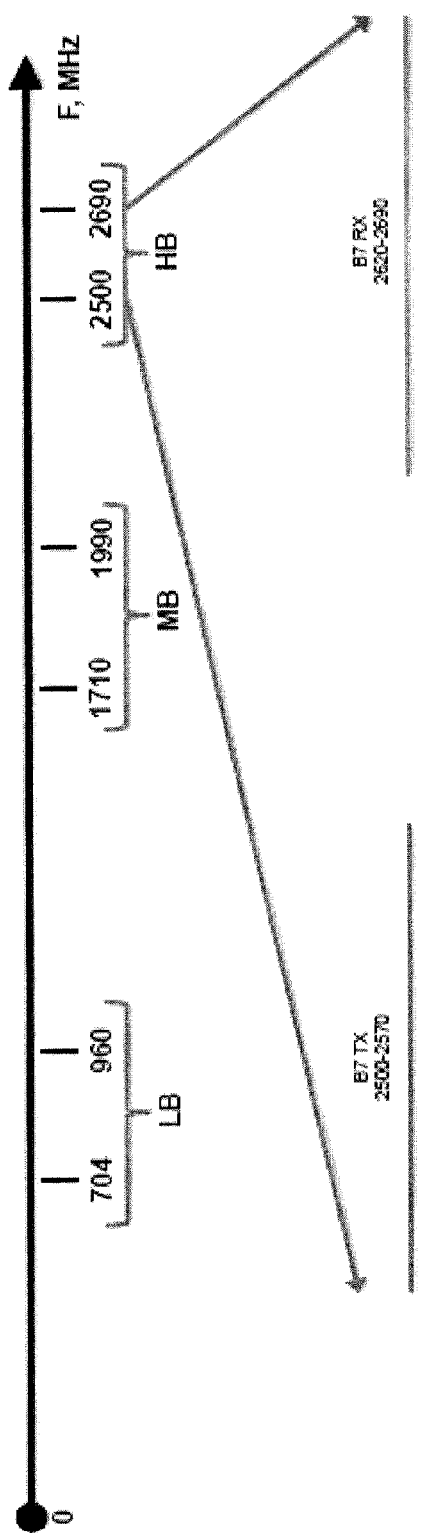
FIG. 4 depicts details of LTE frequencies in a high band, according to non-limiting implementations.

Attention is next directed to FIGS. 2, 3 and 4, each of which depicts spectra of frequencies used in LTE communication networks; each of FIGS. 2, 3 and 4 further show, respectively, details of a "low" band (LB) of frequencies (about 704 MHz to about 960 MHz), a "medium" band (MB) of frequencies (about 1710 MHz to about 1990 MHz), and a "high" band (HB) of frequencies (about 2500 MHz to about 2690 MHz) used for different channels in LTE. The terms "low", "medium" and "high" are used colloquially and/or relative to each other with LTE, and are not meant to limit the range of frequencies of present implementations. Each channel includes a range of frequencies over which transmission of data can occur, and an associated range of frequencies over which receipt of data can occur.

In FIGS. 2, 3, and 4, the term "B#" identifies a given channel number (e.g. B17), and the terms Tx and Rx identify, respectfully, a transmission band/uplink channel and a receive band/downlink channel.

For example, in FIG. 3, channel "B4 Tx" comprises an uplink channel on frequencies 1710-1755 MHz, and "B4 Rx" comprises a paired associated downlink channel on frequencies 2110-2155 MHz.

In other words, there is about a 400 MHz difference between the B4Tx and B4Rx channels. Hence, the channel and radiation properties of antennas 115 can be expected to be very different between the UL channel and the paired DL channel, especially in scenarios where the near-field environment of device 101 is diverse, for example when device is in use in the hand of a user.

For example, consider a scenario where device 101 comprise a handheld mobile device, and device 101 is being held in the left hand of a user and placed against a user's head, e.g. in a voice call. Under these conditions, depending on a location of each antenna 115, antenna 115 can have very different QOS parameters, such as signal strength, for the same channel. For example, when one of antennas 115 is located between the user's left hand and head, this antenna 115 can experience poor reception as compared to the other of antennas 115, presuming the other of antennas 115 is not located between the user's hand and head.

One method of antenna selection for an UL channel can include comparing respective QOS parameters of the paired associated DL channel at each antenna 115, and selecting an antenna 115 to use for the UL channel which has the better respective QOS parameters for the paired associated DL channel.

However, due to the large frequency difference between them, the QOS parameters of B4 Rx will generally not be representative of the quality of B4 Tx. Similar conclusions can be drawn for each of the channels illustrated in FIGS. 2 to 4, where an UL channel is not adjacent a paired, associated DL channel.

Figure 5:
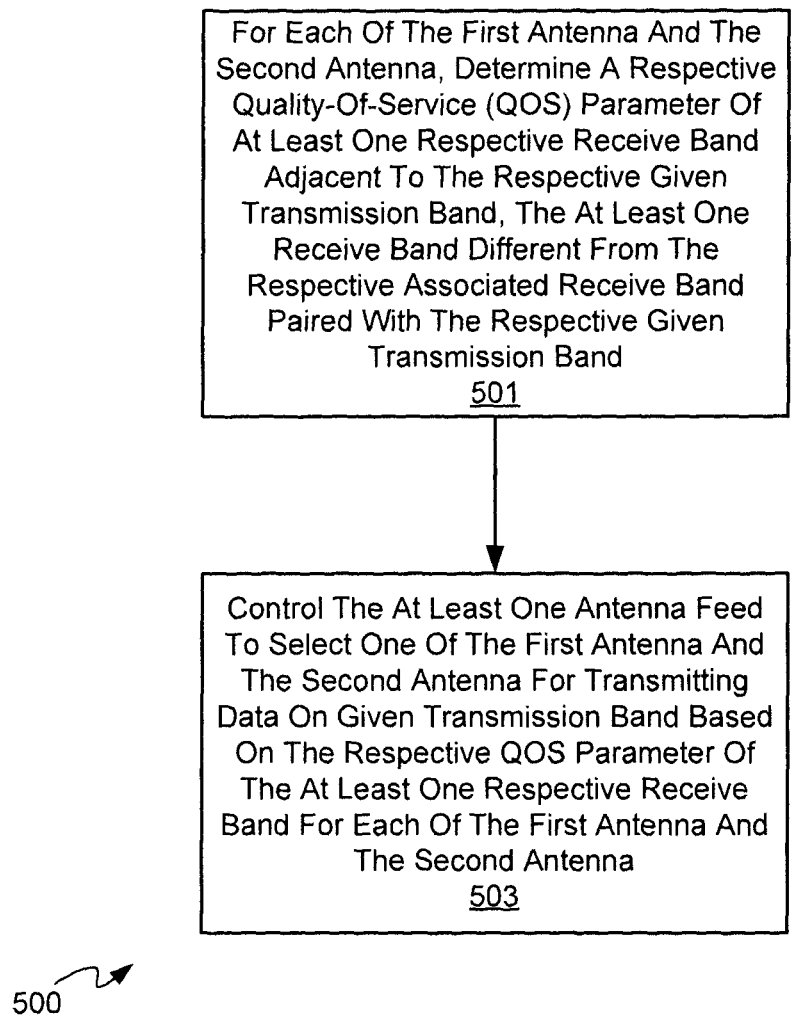
FIG. 5 depicts a block diagram of a flowchart of a method of uplink antenna selection, according to non-limiting implementations.

To address this issue, attention is now directed to FIG. 5 which depicts a flowchart illustrating a method 500 of uplink antenna selection, according to non-limiting implementations. In order to assist in the explanation of method 500, it will be assumed that method 500 is performed using device 101. Furthermore, the following discussion of method 500 will lead to a further understanding of device 101 and its various components. However, it is to be understood that device 101 and/or method 500 can be varied, and need not work exactly as discussed herein in conjunction with each other, and that such variations are within the scope of present implementations. It is appreciated that, in some implementations, method 500 is implemented in device 101 by processor 120, for example by implementing application 145.

It is to be emphasized, however, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood that method 500 can be implemented on variations of device 101 as well.

At block 501, processor 120, for each of first antenna 115-1 and second antenna 115-2, determines a respective quality-of-signal (QOS) parameter of at least one respective receive band adjacent to the respective given transmission band, the at least one respective receive band different from the respective associated receive band paired with the respective given transmission band.

At block 503, processor 120 controls at least one antenna feed 111 to select one of first antenna 115-1 and second antenna 115-2 for transmitting data on respective given transmission band based on the respective QOS parameter of the at least one respective receive band for each of first antenna 115-1 and second antenna 115-2. The logical and/or physical switch can be used to select one of antennas 115.

Block 501 can occur on an ongoing and/or periodic basis, for example whenever device receives data on DL channels. Such receipt of data can include, but is not limited to, pinging a base station on DL channels, receiving messages and/or attachments and/or browser data on DL channels, and the like.

In some implementations, however, block 501 is triggered by a command to transmit data on a given UL channel, including, but not limited to a command to transmit a message and/or an attachment, a request for browser data, and the like.

Regardless, processor 120 is generally configured to monitor DL channels, for example DL channels depicted in FIGS. 2 to 4, and furthermore determine a respective QOS parameter for the DL channels. Such QOS parameters can include, but are not limited to, a signal strength (e.g. in decibels), RSSI (received signal strength indication), signal power, desired signal strength, desired signal power, a channel state, error rate, bandwidth, throughput, transmission delay, availability, jitter, and the like.

For example, consider a scenario where processor 120 is to transmit data on channel B4 Tx, and implements method 500 to determine whether to transmit the data on first antenna 115-1 or second antenna 115-2.

Rather than evaluate each antenna 115 using channel B4 Rx, which is separated from B4 Tx by 400 MHz, processor 120 determines which DL channels are adjacent B4 Tx. From FIG. 3, it is apparent that B3 Rx, in a range of 1805-1890 MHz, is adjacent B4 Tx. Hence a QOS parameter for B3 Rx is determined for each antenna 115: for example $P_{QOS1}$ (a QOS parameter respective to antenna 115-1) is determined for B3 Rx at antenna 115-1, and $P_{QOS2}$ (a QOS parameter respective to antenna 115-2) is determined for B3 Rx at antenna 115-2.

Figure 6:
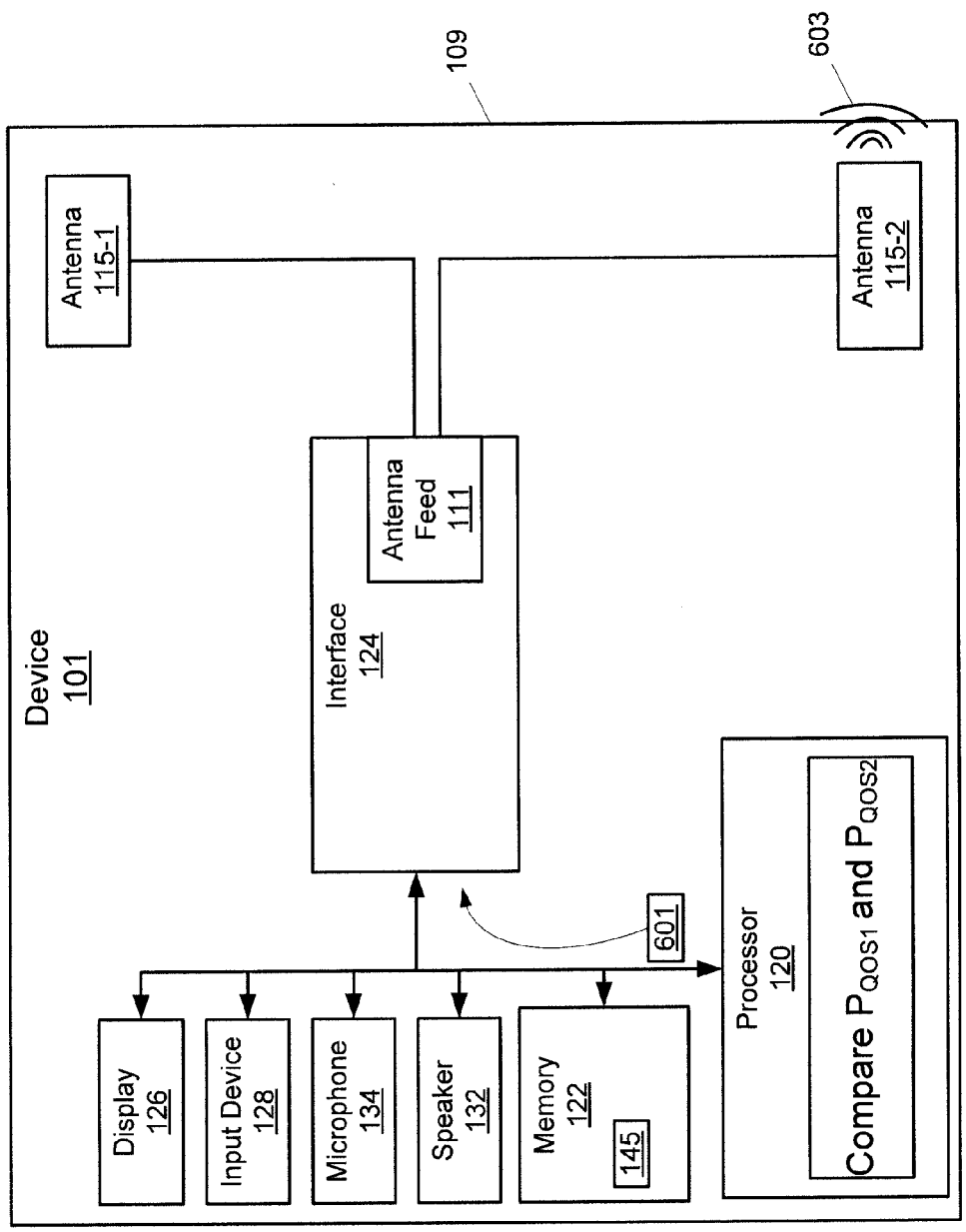
FIG. 6 depicts the device of FIG. 1, with the method of FIG. 5 being implemented therein, according to non-limiting implementations.

Then, as depicted at FIG. 6, processor 120 compares $P_{QOS1}$ and $P_{QOS2}$; the antenna 115 associated with the better of $P_{QOS1}$ and $P_{QOS2}$ is then used. For example, when each of $PAvg_{QOS1}$ and $PAvg_{QOS2}$ comprises signal strength, when antenna 115-2 has better signal strength on B3 Rx than antenna 115-1, then processor 120 controls antenna feed 111 to select antenna 115-2 to transmit data on B4 Tx, for example by sending a command 601 to one or more of interface 124 and antenna feed 111 to select antenna 115-2. As depicted, antenna 115-2 then transmits the data (e.g. as a signal 603) on the respective given transmission band/DL channel (e.g. on B4 Tx).

Hence, block 503 can comprise comparing the respective QOS parameter of the at least one respective receive band for each of first antenna 115-1 and second antenna 115-2.

Alternatively, an average of adjacent receive bands/DL channels can be used to evaluate antennas 115. For example, attention is again directed to FIG. 2, where it is apparent that channel B20 Tx is adjacent to two DL channels: B5 Rx and B20 Rx; while B20 Rx could be used to evaluate B20 Tx, averaging B5 Rx and B20 Rx can provide a more accurate evaluation.

Hence, for example, respective QOS parameters for each of B5 Rx and B20 Rx are determined, and averaged, for each of first antenna 115-1 and second antenna 115-2. Hence a QOS parameter representing the average of each of B5 Rx and B20 Rx is determined for each antenna 115: for example $PAvg_{QOS1}$ (an average QOS parameter respective to antenna 115-1) is determined for B5 Rx and B20 Rx at antenna 115-1, and $PAvg_{QOS2}$ (an average QOS parameter respective to antenna 115-2) is determined for B5 Rx and B20 Rx at antenna 115-2.

Figure 7:
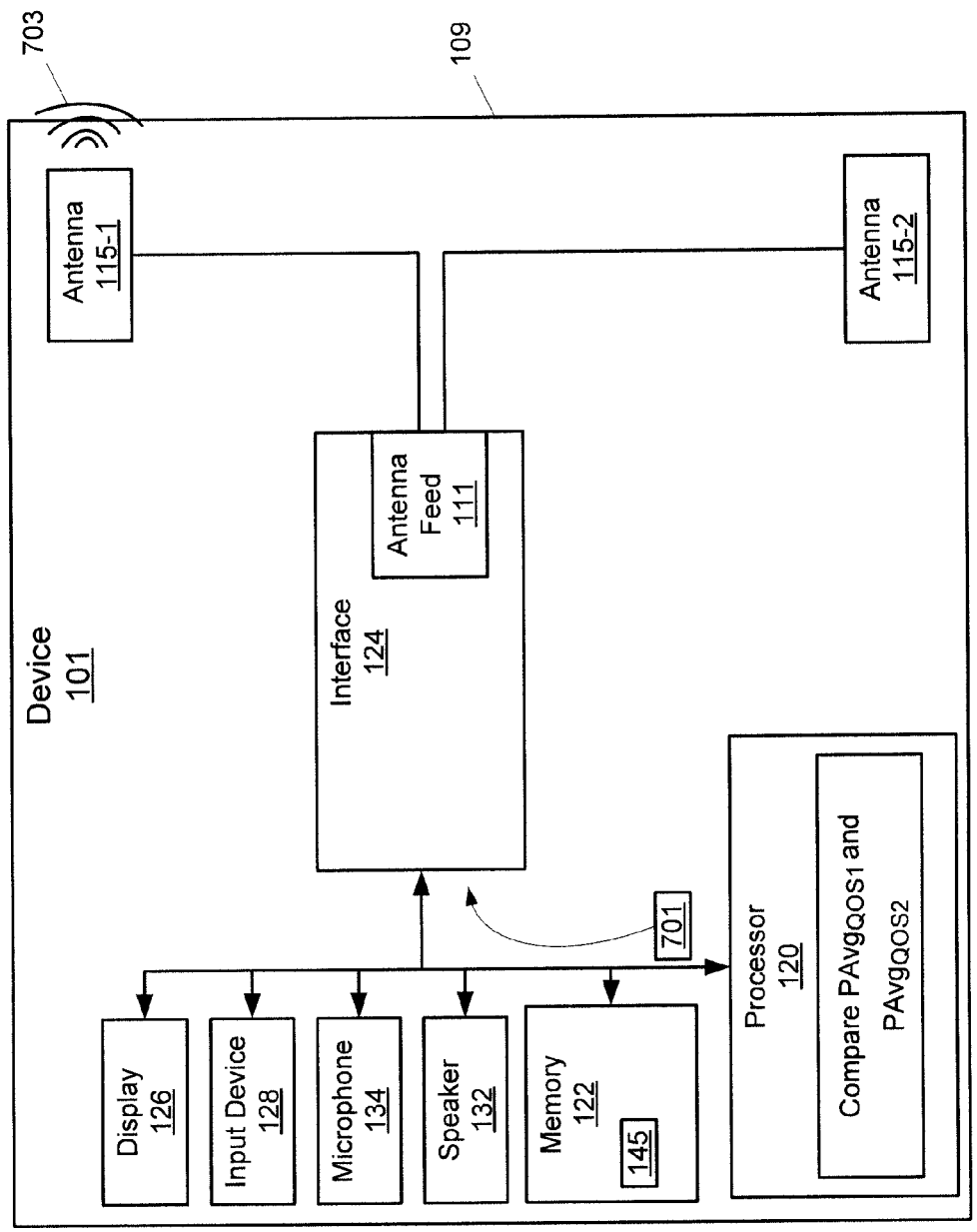
FIG. 7 depicts the device of FIG. 1, with the method of FIG. 5 being implemented therein, according to alternative non-limiting implementations.

Then, as depicted at FIG. 7, processor 120 compares $PAvg_{QOS1}$ and $PAvg_{QOS2}$; the antenna 115 associated with the better of $PAvg_{QOS1}$ and $PAvg_{QOS2}$ is then used. For example, when each of $PAvg_{QOS1}$ and $PAvg_{QOS2}$ comprises respective average signal strength, when antenna 115-1 has better average signal strength on B5 Rx and B20 Rx than antenna 115-2, then processor 120 controls antenna feed 111 to select antenna 115-1 to transmit data on B20 Tx, for example by sending a command 701 to one or more of interface 124 and antenna feed 111 to select antenna 115-1. As depicted, antenna 115-1 then transmits the data (e.g. as a signal 703) on the respective given transmission band/DL channel, e.g. B20 Tx.

In other words, block 503 can alternatively comprise comparing an average of respective QOS parameters of at least two respective receive bands for each of first antenna 115-1 and second antenna 115-2, the at least two receive bands including the at least one respective receive band (different from the respective associated receive band paired with the respective given transmission band) and another receive band adjacent to the respective given transmission band. The another respective receive band can be different from the respective associated receive band paired with the respective given transmission band; alternatively, the another respective receive band can be the same as, and/or can comprise the respective associated receive band paired with the respective given transmission band.

In implementations described heretofore, the DL channels/receive bands used to evaluate UL channels/transmission bands on each antenna 115 are all within a same standard as the UL channels, for example the LTE standard. However, in other implementations, the at least one respective receive band different from the respective associated receive band paired with the respective given transmission band can be associated with one or more of a different radio standard, a different mobile phone standard, and a different generation standard than the respective associated receive band and the respective given transmission band. In other words, the respective given transmission band to be evaluated can be an LTE band, while the receive bands/UL channels used to evaluate the respective given transmission band can be a 3G band, a UMTS band, and the like, and/or any receive band adjacent the respective given transmission band.

Persons skilled in the art will appreciate that there are yet more alternative implementations and modifications possible. For example, it has been assumed heretofore that a respective given transmission band has been selected prior to implementing method 500. However, method 500 can be modified to include selection of the respective given transmission band, as well as selection of antenna 115.

For example, with reference to FIGS. 2 to 4, a plurality of UL channels/transmission bands B1 Tx, B2 Tx, B3 Tx, B4 Tx, B5 Tx, B7 Tx, B8 Tx, B13 Tx, B17 Tx, and B20 Tx, at each of antennas 115 can be evaluated at each antennas 115 using method 500. Processor 120 can then select the respective given transmission band from a plurality of transmission bands, based on QOS parameters of respective receive bands adjacent to each of the plurality of transmission bands, as well as select antenna 115, using method 500 as described above.

In other words, method 500 can be implemented at each antenna 115 for two or more UL channels/transmission bands by evaluating adjacent receive bands for each of the two or more UL channels/transmission bands, at each antenna 115. The UL channel/transmission band, and antenna 115, can be selected based on respective QOS parameters of the adjacent receive bands at each antenna 115.

While implementations described heretofore describe implementations where each of antennas 115 are similar, and further operate in the same frequency bands (e.g. each of antennas 115 can be configured to operate in LTE frequency bands), in other implementations, each of antennas 115 can operate on different frequency bands at the same time such as the case in LTE with Carrier Aggregation (CA); for example downloads can occur (often at the same time) on respective download channels for each antenna 115 at respective different frequencies. In these implementations, method 500 can be applied to determine which of antennas 115 to select, and correspondingly which respective UL channel at that antenna 115. For example, consider a scenario where antenna 115-1 is configured to upload data to a network at a given UL channel operating at a frequency F1, and antenna 115-2 is configured to upload data to a network at a different given UL channel operating at a frequency F2, frequency F2 different from frequency F1. In these scenarios, each respective UL channel at each antenna 115 can be evaluated using method 500 (e.g. by comparing QOS parameters of respective receive bands/DL channels), however, in these implementations, the respective receive bands for each antenna 115 are different from one another. Such implementations can be implemented in carrier aggregation scenarios.

Attention is next directed to FIG. 8, which depicts results of testing method 500 in a prototype of device 101. Specifically signal strength of LTE transmit and receive bands were measured under the conditions of holding device 101 in a left hand, adjacent a head, in a testing chamber with free space signal strength subtracted there from; an average of several measurements were used in generating the table in FIG. 8. LTE compatible antennas were used in the prototype device.

Each of columns 1, 2 and 3 in FIG. 8 respectively show a comparison of: signal strength of LTE UL channels/transmission bands to respective paired associated DL channels/receive (column 1); signal strength of LTE UL channels/transmission bands to one respective adjacent receive band different from a respective associated receive band (column 2); and, signal strength of LTE UL channels/transmission bands to an average of adjacent respective receive bands different from a respective associated receive band (column 3).

For example, attention is directed to column 1 of FIG. 8, where a difference in signal strength (in decibels) between each of B1 Tx, B2 Tx, B3 Tx, B4 Tx, B5 Tx, B7 Tx, B8 Tx, B13 Tx, B17 Tx, and B20 Tx, and, respectively, B1 Rx, B2 Rx, B3 Rx, B4 Rx, B5 Rx, B7 Rx, B8 Rx, B13 Rx, B17 Rx, and B20 Rx is provided. In some instances, the difference is quite large, for example for B4 Tx. In other words, if B4 Rx is used to evaluate B4 Tx as a UL channel, the results will be erroneous.

Attention is directed to column 2 of FIG. 8, where a difference in signal strength (in decibels) between each of B1 Tx, B2 Tx, B3 Tx, B4 Tx, B5 Tx, B8 Tx, and B13 Tx, respective adjacent receive bands is provided (the specific receive band is provided in the adjacent notes). Comparing the values for B4 Tx in column 1 and column 2, it is apparent that the absolute value difference in column 2 (where B3 Rx is used to evaluate B4 Tx, rather than B4 Rx) is less than the absolute value in column 1. Hence, clearly, using B3 Rx, a receive band adjacent B4 Tx, provides a better metric of B4 Tx than B4 Rx.

Such a conclusion can be reached for each UL channel evaluated in column 2 (a comparison between another measurement of B7 Tx and B7 Rx is also provided as, as best seen in FIG. 4, there are no depicted adjacent DL channels for B7 Tx other than B7 Rx; there is little difference between columns 1 and 2).

Attention is directed to column 3 of FIG. 8, where a difference in signal strength (in decibels) between each of B2 Tx, B5 Tx, B13 Tx, and B20 Tx, and an average of respective adjacent receive bands is provided (the specific receive bands are provided in the adjacent notes). Comparing the values for B20 Tx in column 1 and column 3, it is apparent that the absolute value difference in column 3 (where B5 Rx and B20 Rx are used to evaluate B20 Tx, rather than B20 Rx) is less than the absolute value in column 1. Hence, clearly, using B5 Rx and B20 Rx, receive bands adjacent B20 Tx, provides a better metric of B20 Tx than B20 Rx alone.

Such a conclusion can be reached for B2 Tx, and B13 Tx evaluated in column 3.

However, comparing columns 1, 2 and 3 for B5 Tx, the best result (smallest absolute difference) appears in column 2, and the worst result in column 3. Hence, this demonstrates that, in some instances, one technique of implementing method 500 can be better than another technique of implementing method 500. Such decisions can be made using empirical data, which can be stored in memory 122, and indeed, method 500 can be adapted to use one technique (e.g. using one adjacent Rx band) over another technique (e.g. an average of adjacent Rx bands) to select an antenna 115.

Alternatively, all three options can be embedded in an antenna selection algorithm at device 101. Then, for each band of interest, the best approximation among the three approaches can be used to make the selection decision for the UL antenna switching. In other words, the option that leads to the best respective QOS parameter for a receive band can be used to select an antenna 115. The approach used can depend on which QOS parameters are available, and further how far apart (e.g. in MHz, GHz and the like) associated DL and UL channels are. For example, when a DL channel adjacent an UL channel is also the DL channel associated with the UL channel, the approach in column 1 can be used. Furthermore, evaluation of QOS parameters can occur only for those DL channels which are presently active; in other words, when no adjacent DL channels are active, then the approach described above with respect to column 1 can be implemented. Similarly, when only one adjacent DL channel is active, then the approach described above with respect to column 2 can be implemented (compare QOS parameters of adjacent non-associated DL channels, as in FIG. 6). When two adjacent DL channels are available, then the approach described above with respect to column 3 can be implemented (compare average QOS parameters, as in FIG. 7). In other words, in some implementations, DL channels are not activated only to determine their respective QOS parameters, as activating an inactive DL channel could cause problems at one or more transceivers of interface 124.

Provided herein is a device, and method therefore, of uplink antenna selection using adjacent receive bands different from a respective associated receive band paired with a respective given transmission band. Measurements on a prototype of the device has shown that implementation of such an uplink antenna selection technique can lead to a more efficient and/or more accurate selection of an UL antenna.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever. Persons skilled in the art will appreciate that there are yet more alternative implementations and modifications possible, and that the above examples are only illustrations of one or more implementations. The scope, therefore, is to be limited by the claims appended here.

What is claimed is:

1. A device comprising:
   a first antenna; a second antenna; at least one antenna feed connected to the first antenna and the second antenna, each of the first antenna and the second antenna configured to: operate on a same set of channels using a same standard; and transmit data on a plurality of respective transmit channels, each of the respective plurality of transmit channels paired with a respective associated receive channel, each of the plurality of respective transmit channels and each respective associated receive channel is both fixed and predetermined, and common to both the first antenna and the second antenna; and,
   a processor, in communication with the at least one antenna feed, the processor configured to:
      for each of the first antenna and the second antenna, determine a respective quality-of-signal (QOS) parameter of at least one respective receive channel adjacent to a respective transmit channel of the plurality of respective transmit channels, the at least one respective receive channel different from the respective associated receive channel paired with the respective transmit channel; and
      control the at least one antenna feed to select one of the first antenna and the second antenna for transmitting data on the respective transmit channel based on the respective QOS parameter of the at least one respective receive channel adjacent the respective transmit channel for each of the first antenna and the second antenna,
   wherein the processor is further configured to control the at least one antenna feed to select one of the first antenna and the second antenna for transmitting the data on the respective transmit channel by comparing an average of respective QOS parameters of at least two respective receive channels for each of the first antenna and the second antenna, the at least two respective receive channels including the at least one respective receive channel and another respective receive channel adjacent to the respective transmit channel.

2. The device of claim 1, wherein the respective transmit channel is selected based on one of: a same receive channel for each of the first antenna and the second antenna; and, a different receive channel for each of the first antenna and the second antenna, each of the same receive channel and the different receive channel different in frequency from the respective transmit channel.

3. The device of claim 1, wherein the processor is further configured to control the at least one antenna feed to select one of the first antenna and the second antenna for transmitting the data on the respective transmit channel by comparing the respective QOS parameter of the at least one respective receive channel for each of the first antenna and the second antenna.

4. The device of claim 1, wherein the another respective receive channel adjacent to the respective transmit channel is different from the respective associated receive channel paired with the respective transmit channel.

5. The device of claim 1, wherein the another receive channel adjacent to the respective transmit channel, comprises the respective associated receive channel paired with the respective transmit channel.

6. The device of claim 1, the processor further configured to select the respective transmit channel from a plurality of transmission channels, based on QOS parameters of respective receive channels adjacent to each of the plurality of transmission channels.

7. The device of claim 1, wherein a first transmission frequency of a first transmit channel of the first antenna, a first receive frequency of a first receive channel of the first antenna used to evaluate the first transmit channel, a second transmission frequency of a second transmit channel of the second antenna, and a second receive frequency of a second receive channel of the second antenna used to evaluate the second transmit channel are all different.

8. A method comprising:
at a device comprising: a first antenna; a second antenna; at least one antenna feed connected to the first antenna and the second antenna, each of the first antenna and the second antenna configured to: operate on a same set of channels using a same standard; and transmit data on a plurality of respective transmit channels, each of the respective plurality of transmit channels paired with a respective associated receive channel, each of the plurality of respective transmit channels and each respective associated receive channel is both fixed and predetermined, and common to both the first antenna and the second antenna; and, a processor, in communication with the at least one antenna feed:
for each of the first antenna and the second antenna, determining, at the processor, a respective quality-of-signal (QOS) parameter of at least one respective receive channel adjacent to a respective transmit channel of the plurality of respective transmit channels, the at least one respective receive channel different from the respective associated receive channel paired with the respective transmit channel; and
controlling the at least one antenna feed to select one of the first antenna and the second antenna for transmitting data on the respective transmit channel based on the respective QOS parameter of the at least one respective receive channel adjacent the respective transmit channel for each of the first antenna and the second antenna,
wherein the controlling the at least one antenna feed to select one of the first antenna and the second antenna for transmitting the data on the respective transmit channel comprises comparing an average of respective QOS parameters of at least two respective receive channels for each of the first antenna and the second antenna, the at least two respective receive channels including the at least one respective receive channel and another respective receive channel adjacent to the respective transmit channel.

9. The method of claim 8, wherein the respective transmit channel is selected based on one of: a same receive channel for each of the first antenna and the second antenna; and, a different receive channel for each of the first antenna and the second antenna, each of the same receive channel and the different receive channel different in frequency from the respective transmit channel.

10. The method of claim 8, wherein the controlling the at least one antenna feed to select one of the first antenna and the second antenna for transmitting the data on the respective transmit channel comprises comparing the respective QOS parameter of the at least one respective receive channel for each of the first antenna and the second antenna.

11. The method of claim 8, wherein the another respective receive channel adjacent to the respective transmit channel is different from the respective associated receive channel paired with the respective transmit channel.

12. The method of claim 8, wherein the another receive channel adjacent to the respective transmit channel, comprises the respective associated receive channel paired with the respective transmit channel.

13. The method of claim 8, further comprising selecting the respective transmit channel from a plurality of transmission channels, based on QOS parameters of respective receive channels adjacent to each of the plurality of transmission channels.

14. The method of claim 8, wherein a first transmission frequency of a first transmit channel of the first antenna, a first receive frequency of a first receive channel of the first antenna used to evaluate the first transmit channel, a second transmission frequency of a second transmit channel of the second antenna, and a second receive frequency of a second receive channel of the second antenna used to evaluate the second transmit channel are all different.

15. A non-transitory computer-readable medium storing a computer program, wherein execution of the computer program is:
at a device comprising: a first antenna; a second antenna; at least one antenna feed connected to the first antenna and the second antenna, each of the first antenna and the second antenna configured to: operate on a same set of channels using a same standard; and transmit data on a plurality of respective transmit channels, each of the respective plurality of transmit channels paired with a respective associated receive channel, each of the plurality of respective transmit channels and each respective associated receive channel is both fixed and predetermined, and common to both the first antenna and the second antenna; and, a processor, in communication with the at least one antenna feed:
for each of the first antenna and the second antenna, determining, at the processor, a respective quality-of-signal (QOS) parameter of at least one respective receive channel adjacent to a respective transmit channel of the plurality of respective transmit channels, the at least one respective receive channel different from the respective associated receive channel paired with the respective transmit channel; and
controlling the at least one antenna feed to select one of the first antenna and the second antenna for transmitting data on the respective transmit channel based on the respective QOS parameter of the at least one respective receive channel adjacent the respective transmit channel for each of the first antenna and the second antenna,
wherein the controlling the at least one antenna feed to select one of the first antenna and the second antenna for transmitting the data on the respective transmit channel comprises comparing an average of respective QOS parameters of at least two respective receive channels for each of the first antenna and the second antenna, the at least two respective receive channels including the at least one respective receive channel and another respective receive channel adjacent to the respective transmit channel.

* * * * *